(12) United States Patent
Kuo et al.

(10) Patent No.: US 9,959,887 B2
(45) Date of Patent: May 1, 2018

(54) MULTI-PASS SPEECH ACTIVITY DETECTION STRATEGY TO IMPROVE AUTOMATIC SPEECH RECOGNITION

(71) Applicant: INTERNATIONAL BUSINESS MACHINES CORPORATION, Armonk, NY (US)

(72) Inventors: Hong-Kwang J. Kuo, Pleasantville, NY (US); Lidia L. Mangu, New York, NY (US); Samuel Thomas, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 15/064,441

(22) Filed: Mar. 8, 2016

(65) Prior Publication Data

US 2017/0263269 A1     Sep. 14, 2017

(51) Int. Cl.
*G01L 15/00* (2006.01)
*G10L 25/87* (2013.01)
*G10L 15/22* (2006.01)
*G10L 15/14* (2006.01)
(Continued)

(52) U.S. Cl.
CPC ............ *G10L 25/87* (2013.01); *G10L 15/142* (2013.01); *G10L 15/22* (2013.01); *G10L 25/30* (2013.01); *G10L 15/30* (2013.01); *G10L 2015/225* (2013.01)

(58) Field of Classification Search
CPC ......... G10L 15/08; G10L 15/22; G10L 15/26; G10L 15/24; G10L 15/32; G10L 17/005
USPC ....... 704/232, 257, 251, 246, 273, 233, 235, 704/203
See application file for complete search history.

(56) References Cited

U.S. PATENT DOCUMENTS 7,058,573 B1 * 6/2006 Murveit ................. G10L 15/08
                                               704/229
7,085,720 B1 * 8/2006 Gorin .................. G10L 15/1822
                                               704/231

(Continued)

FOREIGN PATENT DOCUMENTS

CA          1218458         2/1987

OTHER PUBLICATIONS

Baig, et al., "Support Vector Machine Based Voice Activity Detection", ISPACS, Dec. 2006, pp. 319-322.

(Continued)

*Primary Examiner* — Michael Colucci
(74) *Attorney, Agent, or Firm* — Tutunjian & Bitetto, P.C.; William J. Stock

(57) ABSTRACT

An automatic speech recognition system and a method performed by an automatic speech recognition system are provided. The method includes performing at least two passes of speech activity detection on an acoustic utterance uttered by a speaker. The at least two passes include an initial pass and a subsequent pass. The method further includes estimating at least one of feature statistics and transforms for acoustic feature extraction and acoustic modeling based on an output of an initial pass. The method further includes performing automatic speech recognition using an output of the subsequent pass while bypassing an output of the initial pass to recognize the acoustic utterance.

19 Claims, 8 Drawing Sheets

(51) Int. Cl.
*G10L 25/30* (2013.01)
*G10L 15/30* (2013.01)

(56) References Cited

U.S. PATENT DOCUMENTS

| | | | | |
|---|---|---|---|---|
| 7,184,957 B2* | 2/2007 | Brookes | ............... | G10L 15/08 704/246 |
| 7,328,155 B2* | 2/2008 | Endo | ............... | G10L 15/08 704/251 |
| 8,301,448 B2* | 10/2012 | Carus | ............... | G10L 15/183 704/251 |
| 8,554,560 B2 | 10/2013 | Valsan | | |
| 8,635,243 B2* | 1/2014 | Phillips | ............... | G10L 15/30 704/235 |
| 8,731,919 B2* | 5/2014 | George | ............... | G10L 15/26 704/235 |
| 2003/0236664 A1* | 12/2003 | Sharma | ............... | G10L 15/08 704/251 |
| 2006/0206331 A1* | 9/2006 | Hennecke | ............... | G10L 15/187 704/254 |
| 2007/0185714 A1* | 8/2007 | Kim | ............... | G10L 15/08 704/254 |
| 2008/0162127 A1* | 7/2008 | Laaksonen | ............... | H04M 3/56 704/225 |
| 2009/0222258 A1* | 9/2009 | Fukuda | ............... | G10L 25/93 704/203 |
| 2009/0326953 A1* | 12/2009 | Peralta Gimenez | .... | G10L 15/26 704/270.1 |
| 2011/0060587 A1* | 3/2011 | Phillips | ............... | G10L 15/30 704/235 |
| 2012/0130713 A1* | 5/2012 | Shin | ............... | G10L 25/78 704/233 |
| 2013/0304478 A1* | 11/2013 | Sun | ............... | G10L 17/04 704/273 |
| 2014/0223310 A1* | 8/2014 | Divay | ............... | G06F 3/167 715/727 |
| 2015/0163602 A1* | 6/2015 | Pedersen | ............... | H04R 25/407 381/315 |

OTHER PUBLICATIONS

IBM, "Automatic Error Detection With Markov Word Models in Automatic Speech Recognition", ip.com, Oct. 1989, pp. 277-279.

Krishna, et al., "Multistream Robust Speaker Recognition Based on Speech Intelligibility", IEEE, Mar. 2011, pp. 1-5.

Lee, et al., "A Voice Trigger System Using Keyword and Speaker Recognition for Mobile Devices", IEEE, Nov. 2009, pp. 2377-2384, vol. 55, No. 4.

Motorola, "Robust Voice Activity Detection Based on the Static and Dynamic Energy for the Embedded System", ip.com, Jun. 2005, 5 pages.

Software Patent Institute, "Suppression of Acoustic Noise in Speech Using Spectral Subtraction", ip.com, Apr. 1979, 40 pages.

Thomas, et al., "Improvements to the IBM Speech Activity Detection System for the Darpa Rats Program", IEEE, Apr. 2015, 5 pages.

* cited by examiner

MULTI-PASS SPEECH ACTIVITY DETECTION STRATEGY TO IMPROVE AUTOMATIC SPEECH RECOGNITION

BACKGROUND

Technical Field

The present invention relates generally to speech recognition and, in particular, to a multi-pass speech activity detection strategy to improve automatic speech recognition.

Description of the Related Art

Speech activity detection (SAD) is a first step in automatic speech recognition (ASR) tasks. This step is essential to identify regions in the audio signal that include speech. The identified regions are then "decoded" by a speech recognition engine to produce word sequences corresponding to the acoustic signal. In matched acoustic conditions, while the performance of ASR is often reasonably good, there are significant degradations in previously unseen noise. One potential reason for these degradations is the inclusion of noise/noisy regions in the estimation of feature statistics and transforms from the audio signal prior to decoding. For example, the means and variances for mean-variance normalization of acoustic features used with various acoustic models can significantly change if music or non-speech acoustic events such as door bangs are included in the data used for the estimation of these feature statistics. Thus, there is a need for improved speech activity detection.

SUMMARY

According to an aspect of the present principles, a method performed by an automatic speech recognition system is provided. The method includes performing at least two passes of speech activity detection on an acoustic utterance uttered by a speaker. The at least two passes include an initial pass and a subsequent pass. The method further includes estimating at least one of feature statistics and transforms for acoustic feature extraction and acoustic modeling based on an output of an initial pass. The method further includes performing automatic speech recognition using an output of the subsequent pass while bypassing an output of the initial pass to recognize the acoustic utterance.

According to another aspect of the present principles, a computer program product for automatic speech recognition is provided. The computer program product includes a non-transitory computer readable storage medium having program instructions embodied therewith. The program instructions are executable by a computer to cause the computer to perform a method. The method includes performing, by an automatic speech recognition system, at least two passes of speech activity detection on an acoustic utterance uttered by a speaker. The at least two passes include an initial pass and a subsequent pass. The method further includes estimating, by the automatic speech recognition system, at least one of feature statistics and transforms for acoustic feature extraction and acoustic modeling based on an output of an initial pass. The method also includes performing, by the automatic speech recognition system, automatic speech recognition using an output of the subsequent pass while bypassing an output of the initial pass to recognize the acoustic utterance.

According to yet another aspect of the present principles, an automatic speech recognition system is provided. The automatic speech recognition system includes a speech activity detector for performing at least two passes of speech activity detection on an acoustic utterance uttered by a speaker. The at least two passes include an initial pass and a subsequent pass. The speech detector is further for estimating at least one of feature statistics and transforms for acoustic feature extraction and acoustic modeling based on an output of an initial pass. The automatic speech recognition system further includes a speech decoder for performing automatic speech recognition using an output of the subsequent pass while bypassing an output of the initial pass to recognize the acoustic utterance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a multi-pass speech activity detection (SAD) strategy to improve automatic speech recognition (ASR).

Advantageously, the present principles minimize and/or otherwise eliminate some of the negative effects imposed on speech recognition due to mismatches in the various feature statistics and/or transforms that are estimated from the acoustic signal for feature extraction.

Speech activity detection is conventionally a single pass operation in ASR, where all regions of speech are first detected and subsequently passed onto an ASR pipeline for processing. To improve ASR performance in the presence of unseen noise, the present principles provide a multi-pass SAD strategy. In this approach, the conventional single SAD step is preceded by an additional pass (or additional passes) with the speech detector operating at a high miss, low-false alarm speech detection operating point. Alternatively, both passes can be performed simultaneously (in parallel). The output from this first pass run is not used for speech recognition but is instead used for the estimation of feature statistics and/or transforms used for the feature extraction and acoustic modeling. By running the speech detector at a high-miss, low-fall alarm speech detection operating point, a considerable amount of regions of audio are bound to be discarded. Advantageously, much of these discarded regions are likely to be regions of non-speech which, if included, can result in mismatched feature statistics and/or transforms when compared to the feature statistics and/or transforms computed during model training. Thus, the omission of these regions during the speech activity detection will result in improved automatic speech recognition.

The present principles can be used for a variety of applications including, but not limited to, speaker identification, speaker verification, speaker diarisation, language identification, keyword spotting, emotion detection, automatic translation, court reporting, hands-free computing, home automation, mobile telephony, and so forth. These and other applications to which the present principles can be applied are readily determined by one of ordinary skill in the art given the teachings of the present principles provided herein, while maintaining the spirit of the present principles.

Figure 1:
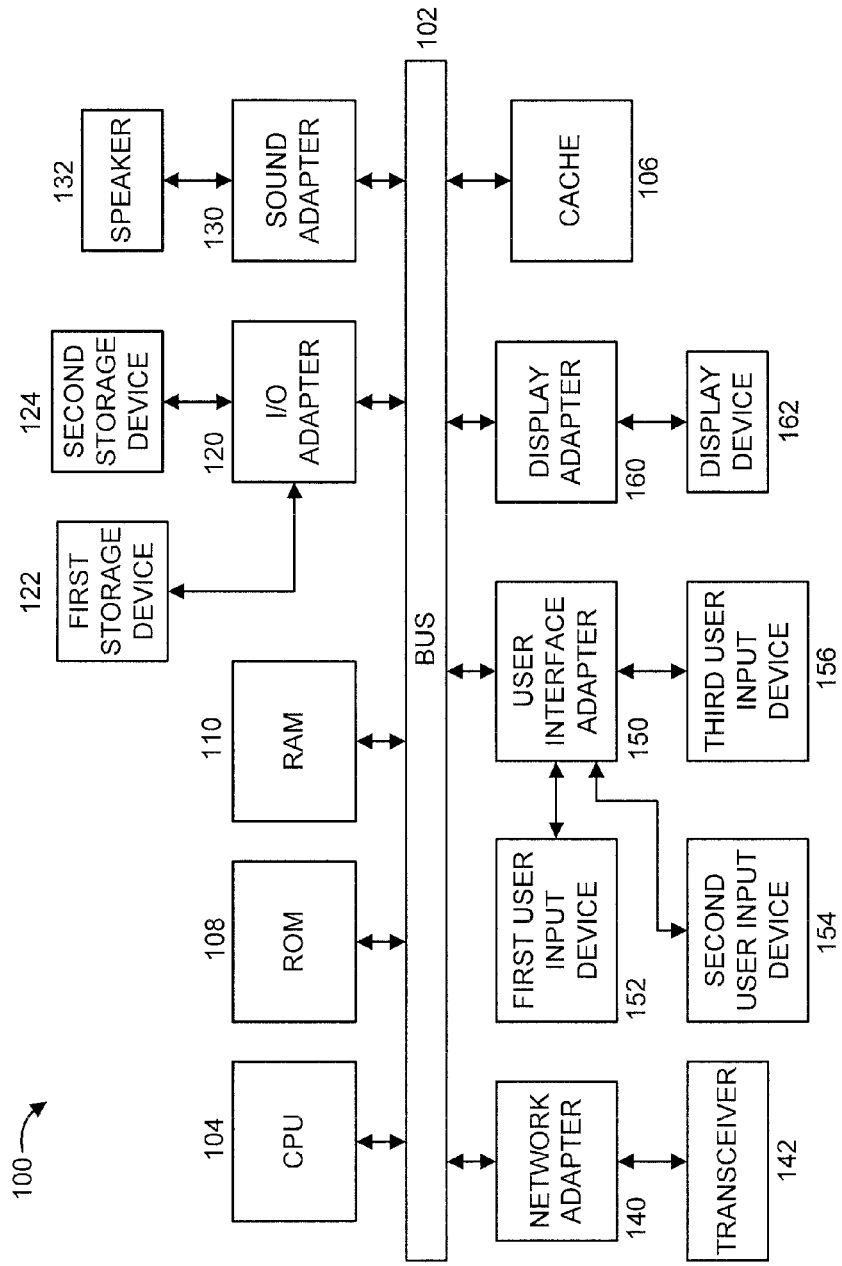
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100. In the embodiment of FIG. 1, at least one of the user input devices 152, 154, and 156 is a microphone for receiving acoustic utterances from one or more speakers.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
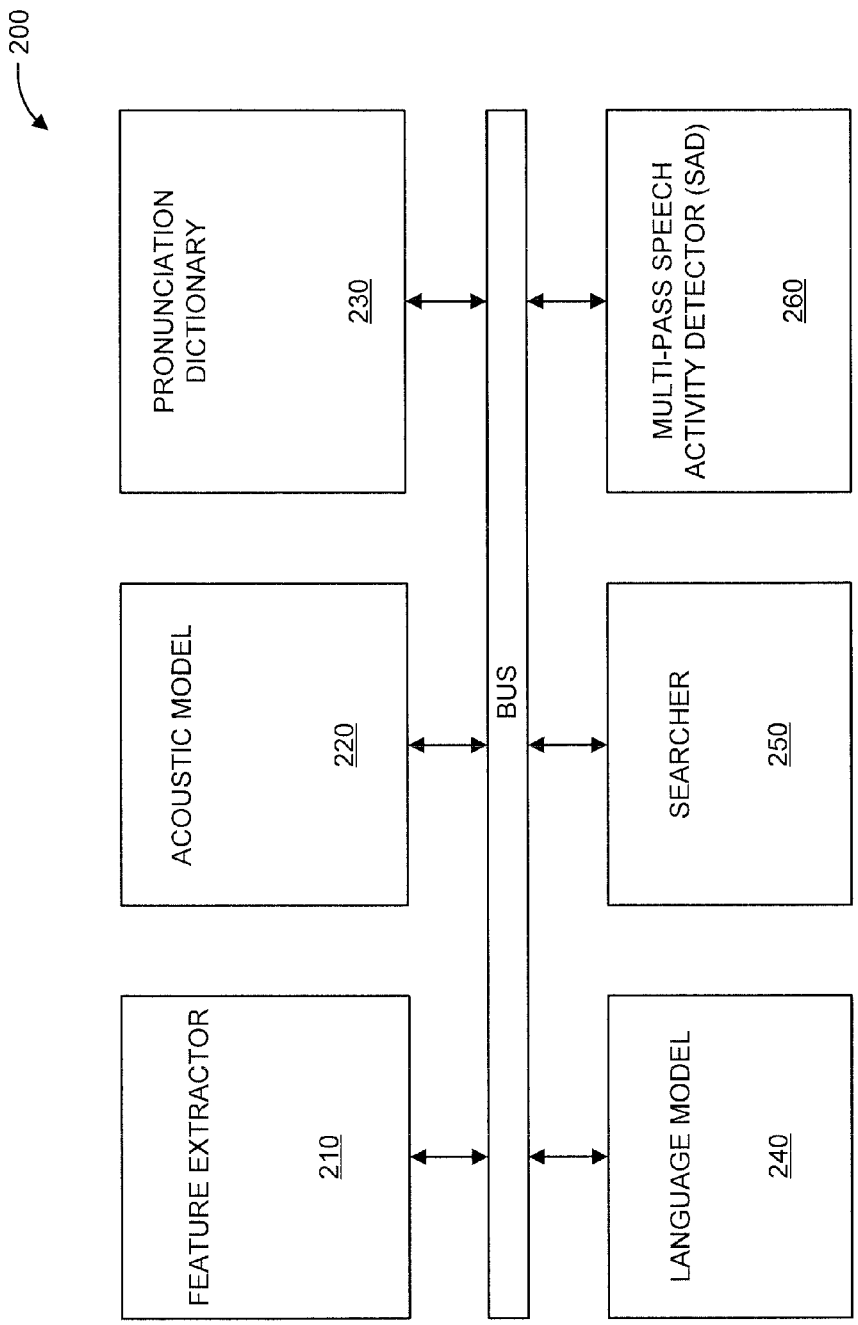
FIG. 2 shows an exemplary automatic speech recognition system (ASR) 200, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
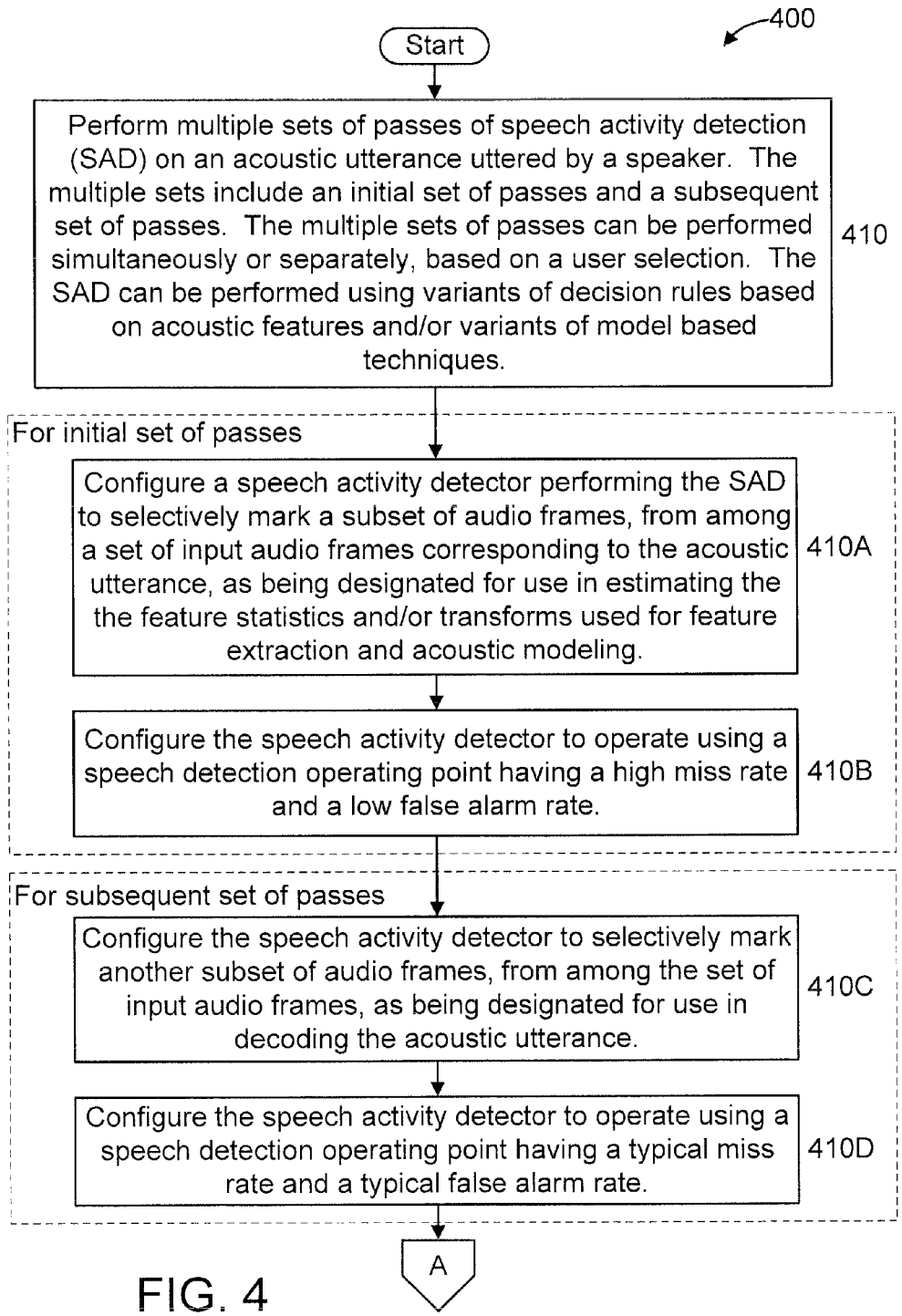
FIGS. 4-5 show an exemplary method 400 for automatic speech recognition using multiple speech activity detection passes, in accordance with an embodiment of the present principles.
Figure 5:
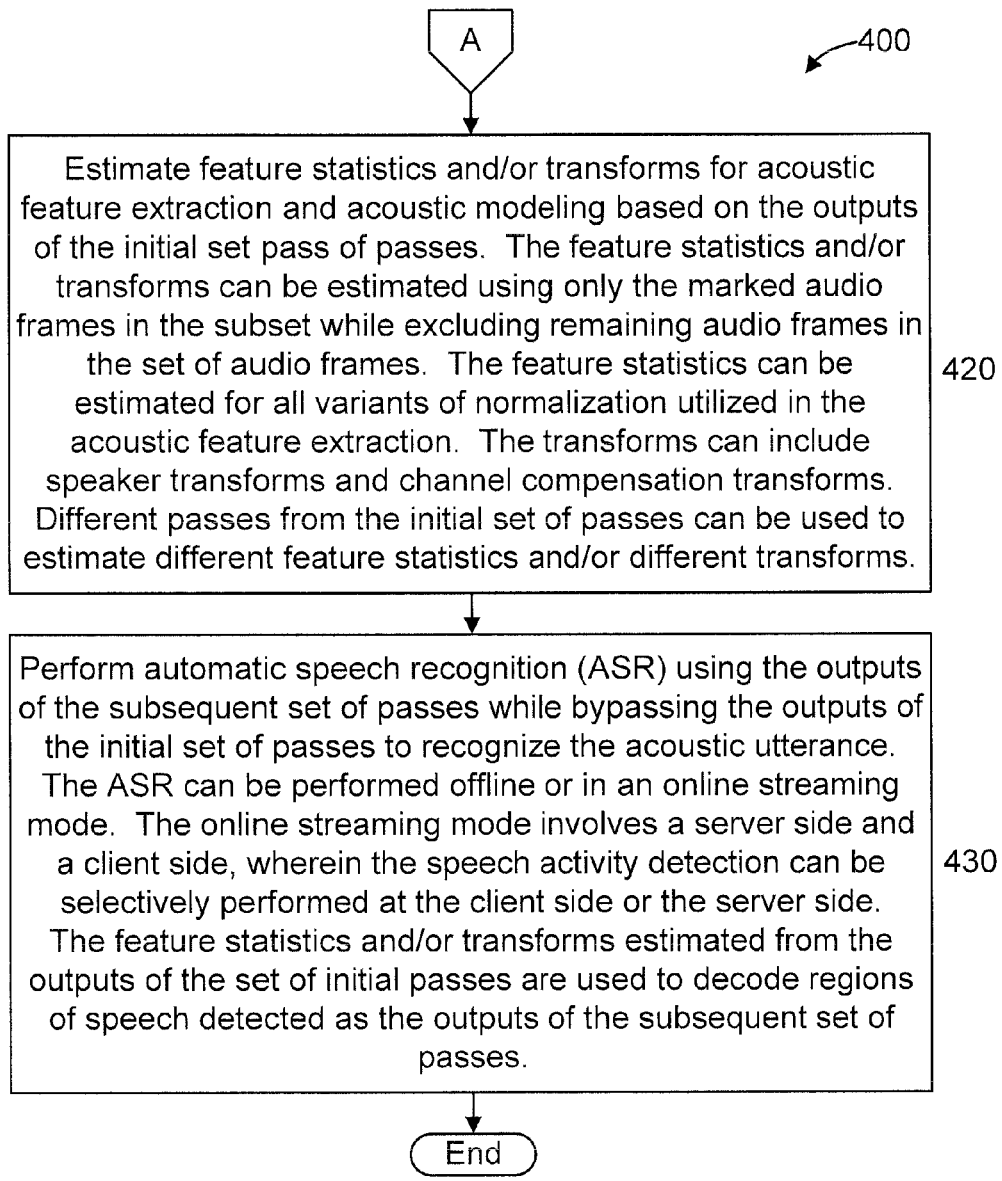

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5.

FIG. 2 shows an exemplary automatic speech recognition system (ASR) 200, in accordance with an embodiment of the present principles.

The system 200 includes a feature extractor 210, an acoustic model 220, a pronunciation dictionary 230, a language model 240, a searcher 250, and a multi-pass speech activity detector 260.

The searcher 250 performs a search using inputs provided from the feature extractor 210, the acoustic model 220, the pronunciation dictionary 230, and the language model 240 to output one or more words representative of a decoded acoustic utterance. While mentioned in singular form, the feature extractor 210, the acoustic model 220, the pronunciation dictionary 230, and the language model can each include more than one of that element. For example, the acoustic model 220 can include multiple acoustic models, at least two being of a different type.

In a word recognition task, given an acoustic signal corresponding to a sequence of words $X=x1, x2, \ldots, xn$, the feature extractor 210 first generates a compact representation of the input as sequence of feature vectors $Y=y1, y2, \ldots, yt$. Some exemplary features that can be extracted by the feature extractor 210 include, but are not limited to, signal energy, pitch, zero crossing rate, and so forth. It is to be appreciated that the preceding features are merely illustrative and, thus, other features can also be extracted in accordance with the teachings of the present principles, while maintaining the spirit of the present principles.

The acoustic model 220, the pronunciation dictionary 230, and the language model 240 are then used by the searcher 250 to find the most probable word sequence X given these feature vectors. This is done by expressing the desired probability $p(X|Y)$ using Bayes theorem as follows:

$$\hat{X} = \underset{X}{\mathrm{argmax}}\, p(X \mid Y) = \underset{X}{\mathrm{argmax}}\, \frac{p(Y \mid X)p(X)}{p(Y)}$$

where p(X) is the a priori probability of observing a sequence of words in the language, independent of any acoustic evidence and is modeled using the language model component. p(X) corresponds to the likelihood of the acoustic features Y being generated given the word sequence X.

The language model 240 and the acoustic model 220 can be stochastic models trained using large amounts training data. Hidden Markov Models (HMMs) or a hybrid combination of neural networks and HMMs can be used to implement acoustic model 220.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 220 is built for basic speech sounds. By using these basic units, the system 200 can also recognize words without acoustic training examples. It is to be appreciated that the basic speech sounds can be context independent phones or context dependent phones or any other such speech sounds.

To compute the likelihood p(Y|X), each word in the hypothesized word sequence X is first broken down into its constituent phones using the pronunciation dictionary 230. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 240 generates the a priori probability p(x). The language model 240 can be an N-gram based language model(s), where typically bi-grams or tri-grams are used. Although p(x) is the probability of a sequence of words, N-grams model this probability assuming the probability of any word xi depends on only N−1 preceding words. These probability distributions are estimated from simple frequency counts that can be directly obtained from large amounts of text. To account for the inability to estimate counts for all possible N-gram sequences, techniques like discounting and back-off are used. The language model 240 can be, but is not limited to, a Neural Network based language model and/or a class based language model.

The multi-pass speech activity detector 260 detects speech in an input signal that includes one or more acoustic utterances uttered by a speaker, so that the subsequent steps of speech recognition can focus on the speech portions of the input signal.

Conventional speech activity detectors perform a single pass whose output is used for both the estimation of feature statistics and transforms as well as for decoding.

In contrast, in an initial pass (or set of initial passes), the multi-pass speech activity detector 260 selectively marks a subset of audio frames, from among a set of input audio frames corresponding to an acoustic utterance, as being designated for use in estimating feature statistics and/or transforms. Thereafter, the feature statistics and/or transforms are estimated using only the marked audio frames in the subset while excluding remaining audio frames in the set of audio frames. In an embodiment, a separate pass can be performed for each feature statistic and/or transform. In another embodiment, the statistics and/or transforms can share a single initial pass.

Moreover, in a subsequent pass (or set of subsequent passes), the multi-pass speech activity detector 260 selectively marks another subset of audio frames, from among the set of input audio frames corresponding to the acoustic utterance, as being designated for use in decoding. Thereafter, the feature statistics and/or transforms (estimated from only the output of the initial pass or set of initial passes) are used to decode the acoustic utterance.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles. Moreover, it is to be appreciated that other types and configurations of a speech recognition system can also be used in accordance with the teachings of the present principles, while maintaining the spirit of the present principles. For example, template matching based systems using forms of dynamic time warping can be used, a probabilistic language model could be replaced by a rule based grammar model, and so forth. The ASR system can also be simple recognizer just recognizing phonemes, it could be a simple isolated word recognizer, a digit recognizer based on rules or a large vocabulary continuous speech recognizer, the components of which we have described. These and other types of speech recognition systems and constituent elements are readily determined by one of ordinary skill in the art, given the teachings of the present principles provided herein, while maintaining the spirit of the present principles.

Figure 3:
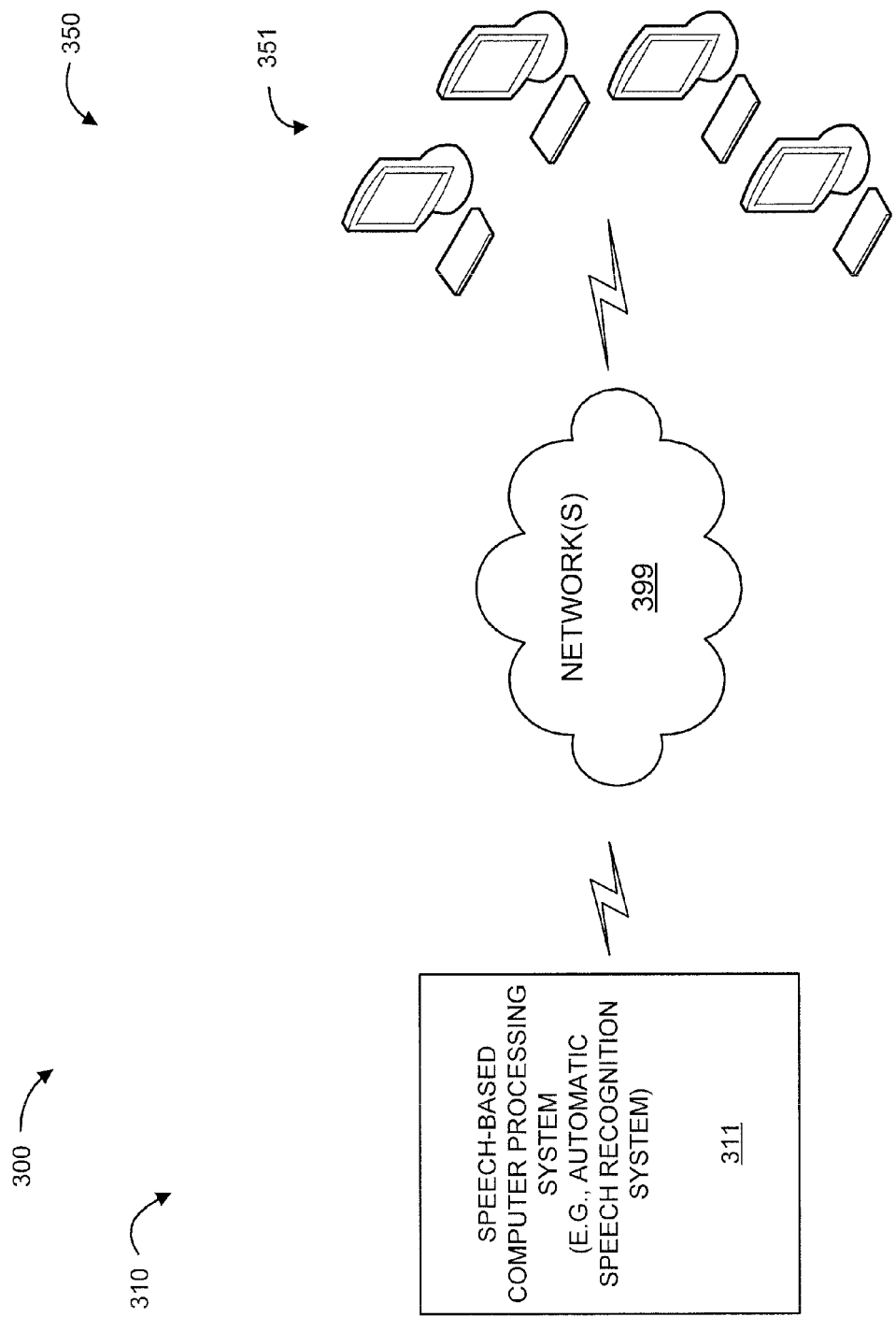
FIG. 3 shows an exemplary operating environment 300 to which the present principles can be applied, in accordance with an embodiment of the present principles.

FIG. 3 shows an exemplary operating environment 300 to which the present principles can be applied, in accordance with an embodiment of the present principles.

The environment 300 involves a server side 310 and a client side 350.

The server side 310 includes a speech-based computer processing system. For illustrative purposes, the speech-based computer processing system is an automatic speech recognition system (ASR) 311. The ASR 311 has improved speech activity detection in accordance with the present principles. In an embodiment, ASR 311 can be implemented as ASR 200 from FIG. 2. However, it is to be appreciated that block 311 can represent any speech-based computer processing system that involves one or more of the following: speaker identification; speaker verification; speaker diarisation; language identification; keyword spotting; emotion detection; automatic translation; court reporting; hands-free computing; home automation; mobile telephony; and so forth.

The client side 350 includes a set of workstations 351.

Users at the workstations 351 can engage in and/or otherwise use speech recognition sessions. The speech recognition sessions can relate, but are not limited to, customer service, voice dialing, machine control, data searching, data entry, system/facility/entity access, and so forth.

Communications between the server side 310 and the client side 350 are made through one or more networks 399.

FIGS. 4-5 show an exemplary method 400 for automatic speech recognition using multiple speech activity detection passes, in accordance with an embodiment of the present principles.

At step 410, perform multiple sets of passes of speech activity detection (SAD) on an acoustic utterance uttered by a speaker. The multiple sets include an initial set of passes and a subsequent set of passes. Each set includes at least one member (i.e., at least one pass). As the prior art conventionally performs a single SAD pass, in an embodiment, the subsequent set of passes includes a single pass, and the initial set of passes includes one or more passes. The multiple sets of passes can be performed simultaneously or separately, based on a user selection.

It is to be appreciated that the initial set of passes relate to the performance of speech activity detection in accordance with the present principles, while the subsequent set of passes can relate to the performance of conventional speech activity detection. Thus, the performance of the (one or more) passes in the initial set of passes provides benefits over the prior art including, but not limited to, improved automatic speech recognition.

In an embodiment, the SAD is performed using variants of decision rules based on acoustic features to differentiate between speech classes and non-speech classes. In an embodiment, the SAD is performed using variants of model based techniques that, in turn, use multi-layer perceptrons, hidden Markov models, and support vector machines to differentiate between speech classes and non-speech classes.

In an embodiment, step 410 includes steps 410A through 410D. Steps 410A and 410B correspond to the initial set of passes, while steps 410C and 410D correspond to the subsequent set of classes.

At step 410A (corresponding to the initial set of passes), configure a speech activity detector performing the SAD to selectively mark a subset of audio frames, from among a set of input audio frames corresponding to the acoustic utterance, as being designated for use in estimating the feature statistics and/or the transforms used for feature extraction and acoustic modeling.

At step 410B (corresponding to the initial set of passes), configure the speech activity detector to operate using a speech detection operating point having a high miss rate and a low false alarm rate.

At step 410C (corresponding to the subsequent set of passes), configure the speech activity detector to selectively mark another subset of audio frames, from among the set of input audio frames, as being designated for use in decoding the acoustic utterance.

At step 410D (corresponding to the subsequent set of passes), configure the speech activity detector to operate using a speech detection operating point having a typical miss rate and a typical false alarm rate.

Thus, relative to step 410D (and the subsequent set of passes), step 410B (which corresponds to the initial set of passes) involves configuring the speech activity detector to operate using a speech detection operating point having a miss rate higher than, and a false alarm rate lower than, the subsequent pass. The speech detection operation point is configured, using the miss rate and the false alarm rate, to discard more non-speech segments (or noisy speech segments) of the acoustic utterance than the subsequent pass.

At step 420, estimate feature statistics and/or transforms for acoustic feature extraction and acoustic modeling based on the outputs of the initial set pass of passes.

In an embodiment, the feature statistics and/or transforms are estimated using only the marked audio frames in the subset while excluding remaining audio frames in the set of audio frames.

In an embodiment, the feature statistics are estimated for all variants of normalization utilized in the acoustic feature extraction. For example, such variants can include, but are not limited to, mean normalization, mean-variance normalization, cepstral mean normalization, cepstral mean-variance normalization, and so forth.

In an embodiment, transforms can include speaker transforms and channel compensation transforms. For example, such transforms can include, but are not limited to, vocal tract normalization, feature Maximum Likelihood Linear Regression (fMLLR), and so forth.

In an embodiment, one or more of the following acoustic features are used: Perceptual Linear Prediction (PLP) features; voicing features, frequency domain linear prediction (FDLP) features; and log-mel features. Of course, the present principles are not limited to the preceding types of acoustic features and, thus, other acoustic features can also be used in accordance with the teachings of the present principles, while maintaining the spirit of the present principles. In an embodiment, the acoustic features are used to train the acoustic models used for ASR decoding.

It is to be appreciated that different passes from the initial set of passes can be used to estimate different feature statistics and/or different transforms. These different feature statistics and different transforms can then be used for ASR decoding (per step 430).

At step 430, perform automatic speech recognition (ASR) using the outputs of the subsequent set of passes while bypassing the outputs of the initial set of passes to recognize the acoustic utterance.

In an embodiment, the ASR can be Neural Network based, Hidden Markov Model/Gaussian Mixture Model based, Support Vector Machine based, template based, or a combination thereof. Regarding Neural Networks, any type can be used including, but not limited to, Deep Neural Networks (DNN), Convolutional Neural Networks (CNN), and so forth.

In an embodiment, the ASR is performed offline or in an online streaming mode. The online streaming mode involves a server side and a client side, wherein the speech activity detection can be selectively performed at the client side or the server side. In an embodiment, the server side is implemented in the cloud (see, e.g., FIGS. 6-8).

In an embodiment, the feature statistics and/or transforms estimated from the outputs of the set of initial passes are used to decode regions of speech detected as the outputs of the subsequent set of passes.

It is to be appreciated that various aspects of the present principles can be implemented using cloud computing. For example, various aspects of the present principles can be implemented using one or more of the following cloud computing configurations: Software as a Service (SaaS); Platform as a Service (PaaS); and Infrastructure as a Service (IaaS). In an embodiment, one or more elements of system 200 are implemented using a cloud computing configuration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
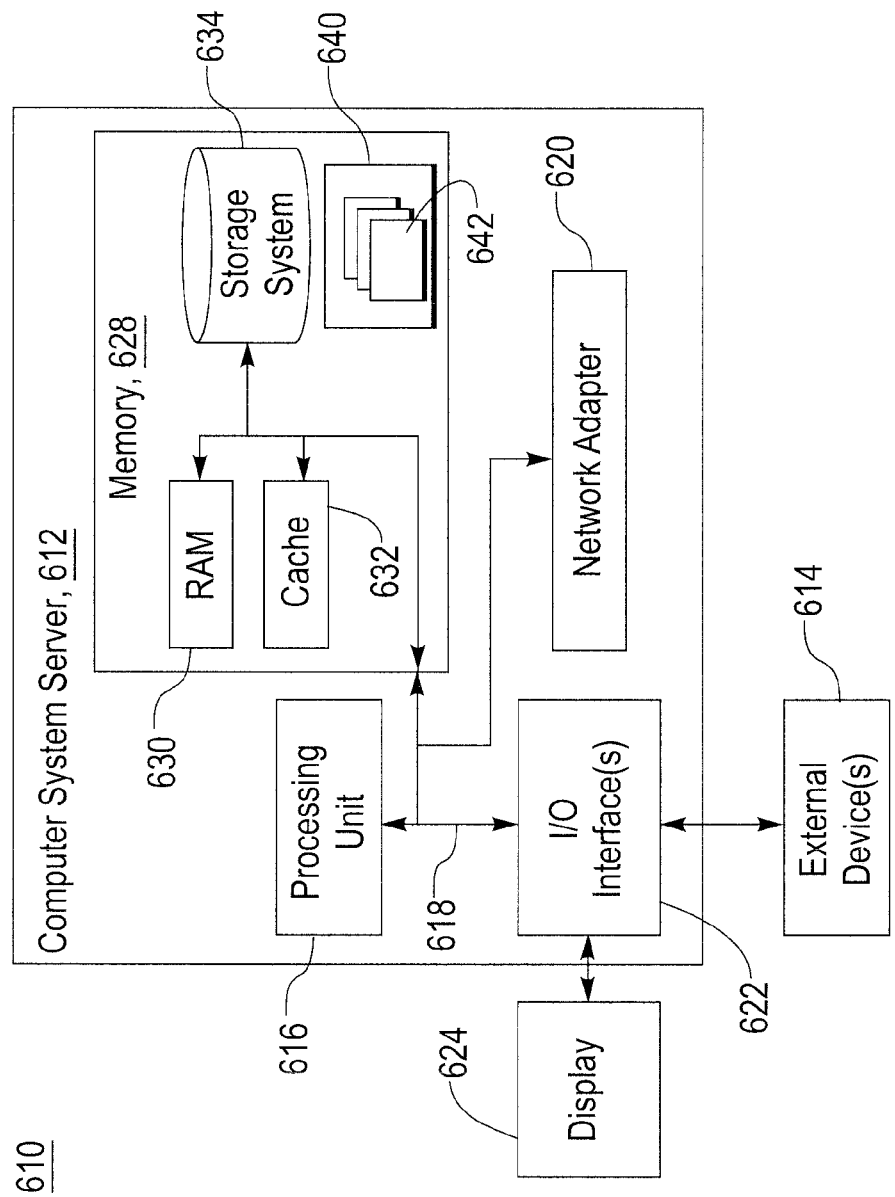
FIG. 6 shows an exemplary cloud computing node 610, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
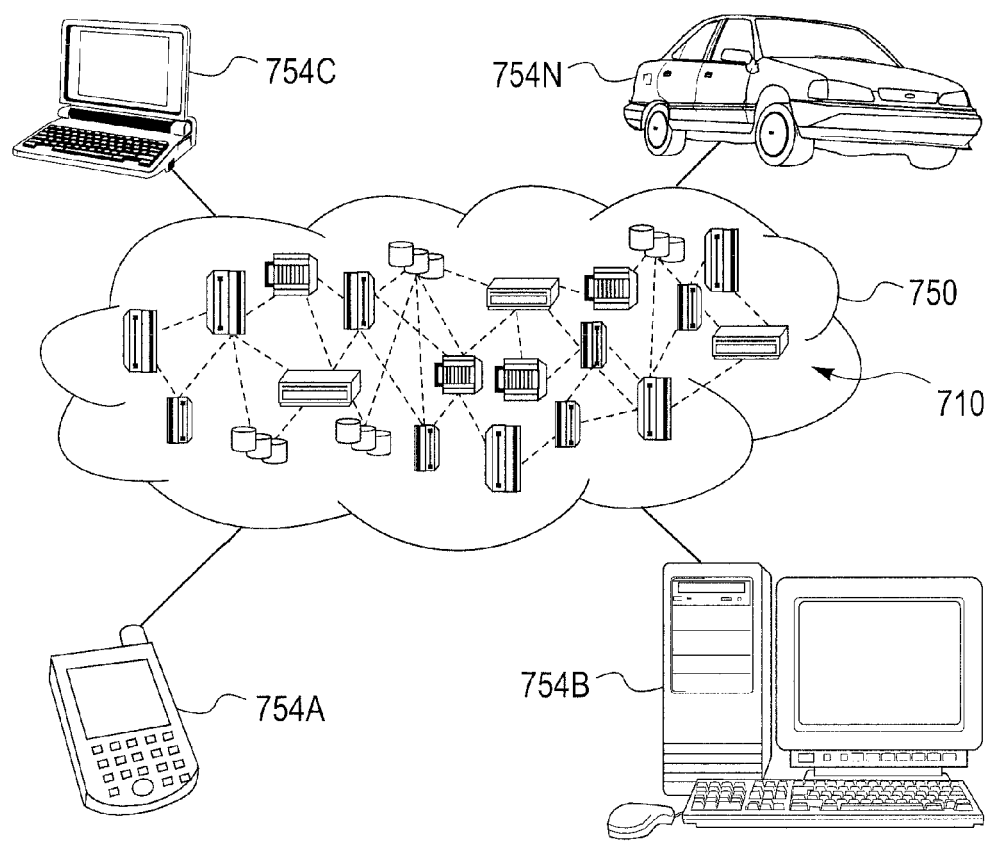
FIG. 7 shows an exemplary cloud computing environment 750, in accordance with an embodiment of the present principles.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
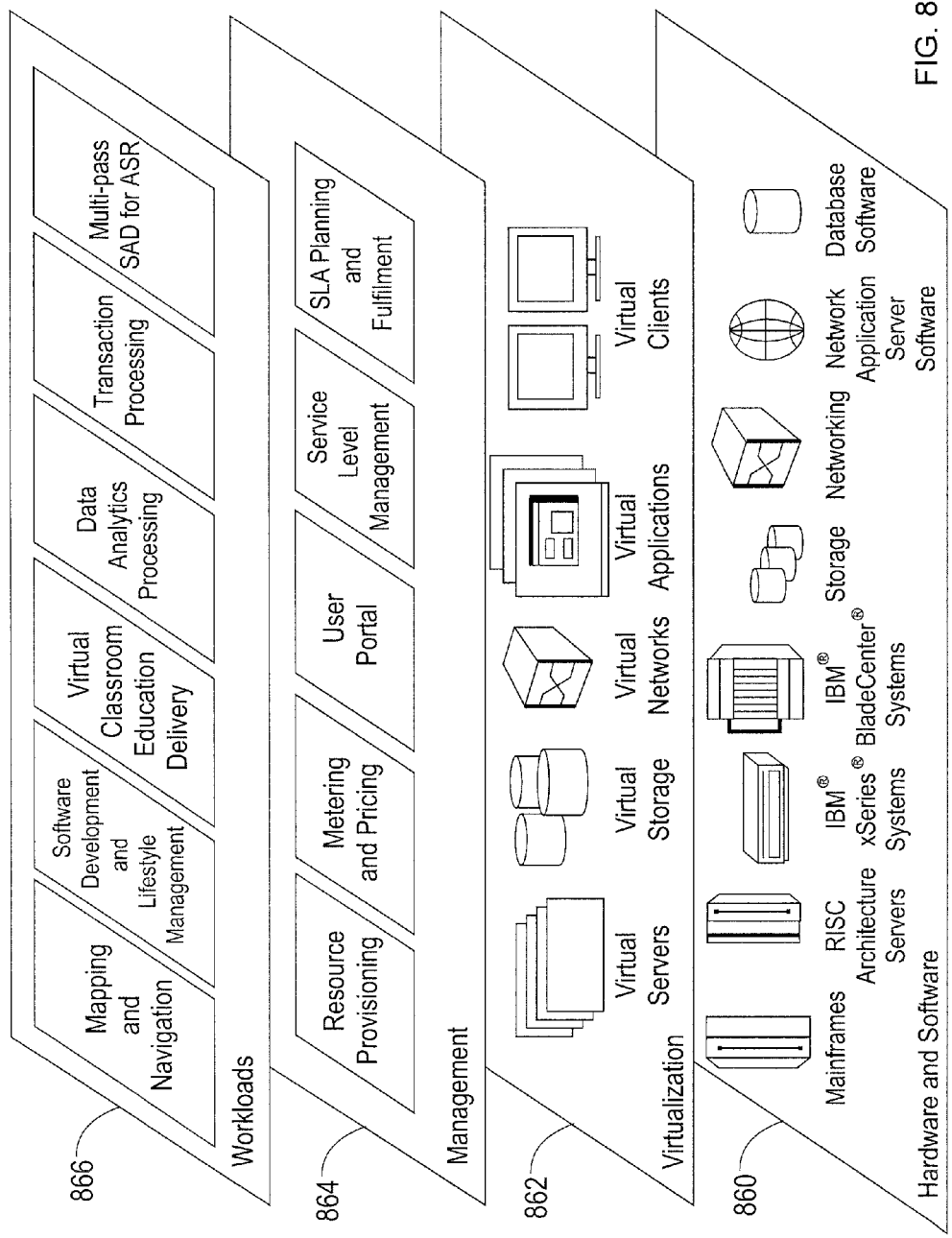
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multi-pass speech activity detection (SAD) for automatic speech recognition (ASR).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method performed by an automatic speech recognition system having a processor, comprising:
    performing, by the processor, at least two passes of speech activity detection on an acoustic utterance uttered by a speaker, the at least two passes including an initial pass and a subsequent pass;
    estimating, by the processor, at least one of feature statistics and transforms for acoustic feature extraction and acoustic modeling based on an output of an initial pass; and
    performing, by the processor, automatic speech recognition using an output of the subsequent pass and the at least one of the feature statistics and transforms estimated from the initial pass while bypassing an output of the initial pass to recognize the acoustic utterance and output a textual representation of the acoustic utterance,
    wherein the at least two passes are performed simultaneously or separately, based on a user selection.

2. The method of claim 1, wherein the initial pass is performed by configuring a speech activity detector to operate using a speech detection operating point having a miss rate higher than, and a false alarm rate lower than, the subsequent pass.

3. The method of claim 2, wherein the speech detection operation point is configured, using the miss rate and the false alarm rate, to discard more non-speech segments of the acoustic utterance than the subsequent pass.

4. The method of claim 1, where the speech activity detection is performed using variants of decision rules based on acoustic features to differentiate between speech classes and non-speech classes.

5. The method of claim 1, where the speech activity detection is performed using variants of model based techniques that, in turn, use multi-layer perceptrons, hidden Markov models, and support vector machines to differentiate between speech classes and non-speech classes.

6. The method of claim 1, where the automatic speech recognition is Neural Network based, Hidden Markov Model/Gaussian Mixture Model based, Support Vector Machine based, template based, or a combination thereof.

7. The method of claim 1, where the automatic speech recognition is performed offline or in an online streaming mode.

8. The method of claim 7, wherein the online streaming mode involves a server side and a client side, the speech activity detection is selectively performed at the client side or the server side.

9. The method of claim 1, wherein in the initial pass, a subset of audio frames is selectively marked, from among a set of input audio frames corresponding to the acoustic utterance, as being designated for use in estimating the at least one of the feature statistics and the transforms, and wherein the at least one of the feature statistics and the transforms are estimated using only the marked audio frames in the subset while excluding remaining audio frames in the set of audio frames.

10. The method of claim 9, wherein in the subsequent pass, another subset of audio frames is selectively marked, from among the set of input audio frames, as being designated for use in decoding, and wherein the acoustic utterance is decoded using the at least one of the feature statistics and the transforms.

11. The method of claim 1, where the feature statistics are estimated for variants of normalization utilized in the acoustic feature extraction.

12. The method of claim 1, where the transforms comprise speaker transforms and channel compensation transforms.

13. The method of claim 1, where the at least one of the feature statistics and the transforms estimated from the output of the initial pass are used to decode regions of speech detected as the output of the subsequent pass.

14. The method of claim 1, where the at least two passes comprise an initial set of passes and a subsequent set of passes with respect to the initial set of passes, wherein outputs of the initial set of passes are constrained for use in estimating the least one of the feature statistics and the transforms for acoustic feature extraction and acoustic modeling, and wherein outputs of the subsequent set of passes are used, while the outputs of the initial set of passes are bypassed, to recognize the acoustic utterance uttered by the speaker.

15. The method of claim 1, wherein the at least two passes comprises a plurality of initial passes and at least one subsequent pass with respect to the plurality of initial passes, and wherein said estimating step estimates at least one of a single feature statistic and a single transform based on an output of a respective one of the plurality of initial passes.

16. A computer program product for automatic speech recognition, the computer program product comprising a non-transitory computer readable storage medium having program instructions embodied therewith, the program instructions executable by a computer to cause the computer to perform a method comprising:
    performing, by a processor of an automatic speech recognition system, at least two passes of speech activity detection on an acoustic utterance uttered by a speaker, the at least two passes including an initial pass and a subsequent pass;

estimating, by the processor, at least one of feature statistics and transforms for acoustic feature extraction and acoustic modeling based on an output of an initial pass; and performing, by the processor, automatic speech recognition using an output of the subsequent pass and the at least one of the feature statistics and transforms estimated from the initial pass while bypassing an output of the initial pass to recognize the acoustic utterance and output a textual representation of the acoustic utterance, wherein the at least two passes are performed simultaneously or separately, based on a user selection.

17. The computer program product of claim 16, wherein in the initial pass, a subset of audio frames is selectively marked, from among a set of input audio frames corresponding to the acoustic utterance, as being designated for use in estimating the at least one of the feature statistics and the transforms, and wherein the at least one of the feature statistics and the transforms are estimated using only the marked audio frames in the subset while excluding remaining audio frames in the set of audio frames.

18. The computer program product of claim 16, where the at least one of the feature statistics and the transforms estimated from the output of the initial pass are used to decode regions of speech detected as the output of the subsequent pass.

19. An automatic speech recognition system having a processor, comprising:
    a speech activity detector, implemented by the processor, for performing at least two passes of speech activity detection on an acoustic utterance uttered by a speaker, the at least two passes including an initial pass and a subsequent pass, and for estimating at least one of feature statistics and transforms for acoustic feature extraction and acoustic modeling based on an output of an initial pass; and
    a speech decoder, implemented by the processor, for performing automatic speech recognition using an output of the subsequent pass and the at least one of the feature statistics and transforms estimated from the initial pass while bypassing an output of the initial pass to recognize the acoustic utterance and output a textual representation of the acoustic utterance,
    wherein the at least two passes are performed simultaneously or separately, based on a user selection.

* * * * *